Aug. 31, 1926. 1,598,242
G. D. CHADEAYNE
RELIEF VALVE AND TRAP
Filed April 13, 1925
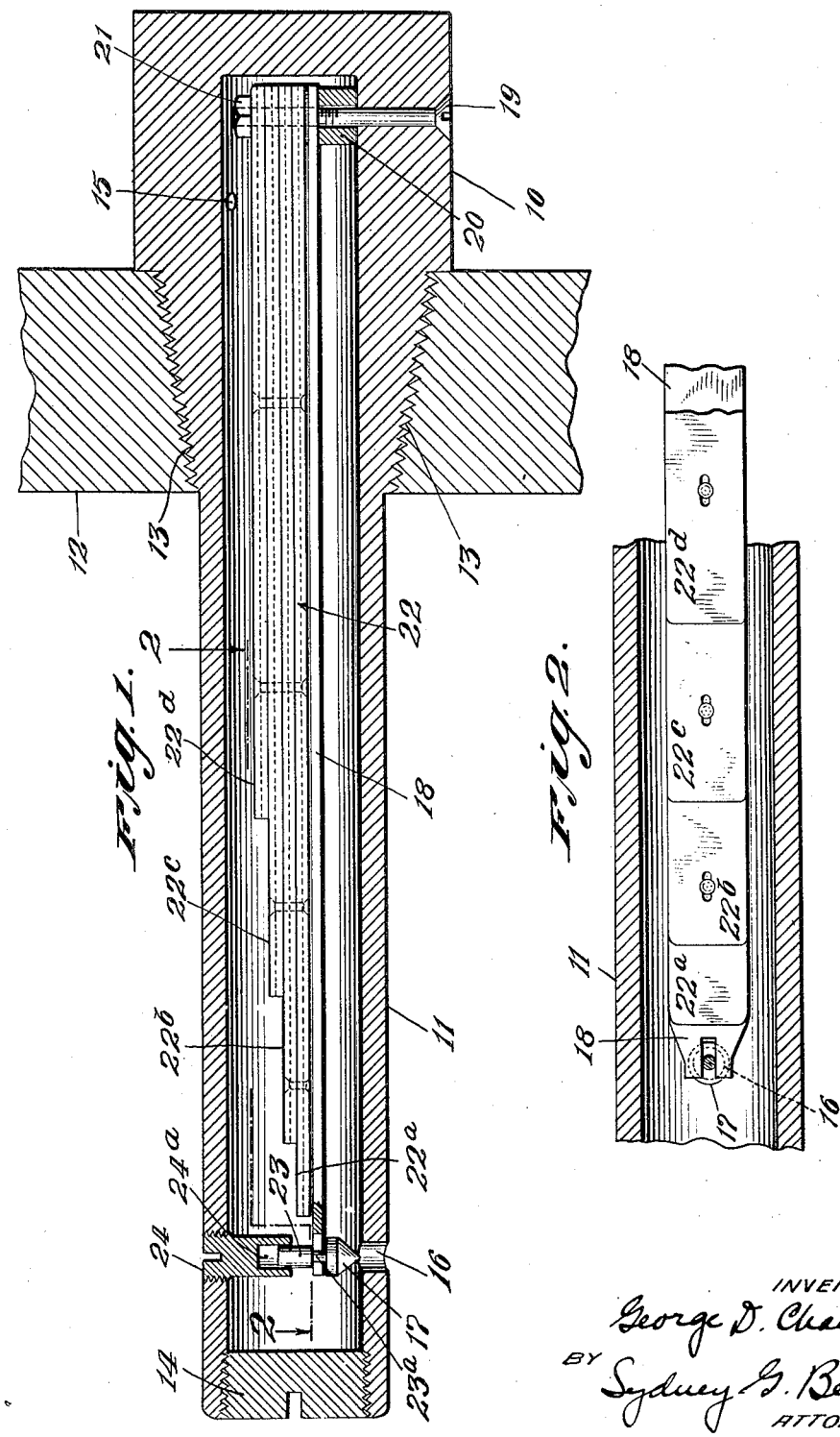
INVENTOR
George D. Chadeayne
BY Sydney G. Berry
ATTORNEY Patented Aug. 31, 1926.

1,598,242

UNITED STATES PATENT OFFICE.

GEORGE D. CHADEAYNE, OF NEW HAVEN, CONNECTICUT.

RELIEF VALVE AND TRAP.

Application filed April 13, 1925. Serial No. 22,602.

My present invention relates to devices for releasing relatively cold fluids, as for example air and water from steam or vapor systems. In such systems it is frequently desirable to maintain the partial vacuum formed when the steam therein condenses after the steam supply thereto has been shut off, so that when the steam is turned on it will quickly fill the system. Such vacua however are seldom perfect and it is usually necessary to vent the air which has collected in the system when it is again to be filled with steam. As will be readily understood, when venting the air or water, it is desirable that the valve open as soon as atmospheric pressure has been attained within the system whereby the system will be filled with steam no matter how slight the steam pressure may be.

It is the object therefore of my present invention to provide a relief valve or trap which shall fulfill the above mentioned requirements, which shall be positive acting, of simple construction, and easy to manufacture.

My invention will be best understood from the following detailed description taken with the annexed drawing in which Figure 1 is an enlarged view partly in section showing the application of my invention to a relief valve for venting air from a steam radiator or the like; while Figure 2 is a view of a section taken on line 2—2 of Fig. 1.

In the above drawing, 10 represents a casing of suitable material having a reduced portion 11 adapted to be inserted through a wall 12 of a steam radiator or the like and to engage said wall by means of an intermediate threaded portion 13 as shown. The inside end of casing 10 may be stopped by a threaded plug 14, while its outer end is provided with an outlet hole 15.

I provide, preferably adjacent the inner end of casing 10, an outlet passage or valve seat 16. A tapered valve 17 is provided to fit on said seat, valve 17 preferably being composed of a non-corrodible metal having good bearing qualities, such as Monel metal.

As shown, valve 17 is attached to a member 18 constituting a spring element which is secured to the casing 10 conveniently by means of a bolt 19 passing through the end thereof and secured by means of a block 20 and nut 21. Preferably secured by means of bolt 19 is also a thermostatic element 22 which, as shown, rests upon spring element 18. The end of spring 18 may be forked as shown in Fig. 2, whereby to engage a restricted portion 23$^a$ of the valve stem 23. Valve stem 23 works in a guide formed of a recess 24$^a$ of a threaded plug 24. As will be evident from the drawing, plug 24 is insertable through the end of the casing 11, being screwed into the wall opposite the valve opening 16.

Thermostatic element 22 is arranged so as to become convex downward when hot, thereby forcing valve 17 upon its seat against the action of spring 18. The strength of the latter is chosen preferably so as substantially to compensate for the weight of valve 17 plus any slight amount necessary to overcome the tendency of the valve to stick.

It will be seen that while the valve 17 is closed by the action of the thermostatic element 22, the latter is inoperative to open the valve when cold. However, when the thermostatic element 22 is cold the valve 17 will open due to the spring action of element 18 provided the pressure within the radiator or the like has attained a pressure substantially equal to the atmospheric. In the usual case, when the steam supply to the radiator is shut off, the pressure will drop below the atmospheric before the thermostatic element has cooled sufficiently to allow the valve to open, and hence the valve will remain closed when the radiator is cold and thus tend to maintain the vacuum produced in the radiator. When on the other hand, the steam supply is turned on, due to the diminished pressure prevailing therein, the radiator will quickly be filled with steam, and the air vented just so soon as the pressure has built up to the atmosphere, since the weight of the valve 17 is compensated for by the spring element 18. It will be understood that while the valve as a whole preferably occupies the position shown in the drawing, i. e., such that gravity acts to close the valve, (as in this position the condensate is allowed to drain through the valve opening 16), other positions are possible, in which case the spring element 18 will be adjusted so as to open the valve when the pressures on either side thereof are substantially equal.

While thermostatic element 22 may be of any standard construction, I preferably employ a plurality of composite strips 22$^a$, 22$^b$, 22ᶜ, 22ᵈ secured together at appropriate intervals, each strip consisting of two metals having dissimilar coefficients of expansion and arranged so that their thermostatic effect is additive. This construction enables the strips above the lowermost progressively to be decreased in length measured from the supported end, thus making for economy in construction without the sacrifice of strength.

The above described valve permits a large portion of it to be placed within the radiator. This location is advantageous in that it prevents water from the radiator walls from entering the valve chamber, besides affording a more sightly appearance by virtue of such location.

It will be evident, however, that my improved device may be disposed in other locations, particularly where it will serve to relieve the system to which it is applied of relatively cold condensate or other fluid. In such locations mentioned it is commonly designated a trap.

What I claim is:—

1. In a relief valve or trap, a casing adapted to be secured to a steam or vapor system and having a passage therethrough, a valve seat in said passage, a valve proper movable to and from said seat, said valve being disposed so that subatmospheric pressure in said system tends to maintain the valve closed, a thermostatic element having a non-positive connection with said valve whereby said element last mentioned is operative to close same when said element is hot, but is inoperative to open the valve when cold and positive means attached to said valve for opening same.

2. In a relief valve or trap, a casing adapted to be secured to a steam or vapor system and having a passage therethrough for venting said system, a valve seat in said passage, a valve proper movable to and from said seat, said valve being disposed so that subatmospheric pressure in said radiator tends to maintain the valve closed, a thermostatic element having a non-positive connection with said valve whereby said element last mentioned is operative to close same when said element is hot, but is inoperative to open the valve when cold and a spring element for opening said valve.

3. In a relief valve or trap, a casing adapted to be secured to a steam or vapor system and having a passage therethrough for venting said system, a valve seat in said passage, a valve proper movable to and from said seat, said valve being disposed so that subatmospheric pressure within the system tends to maintain the valve closed, a spring element attached to said valve and adapted to open same when the pressure on either side thereof is substantially equal and a thermostatic element having a non-positive connection with said valve whereby said element last mentioned is operative to close same when said element is hot but is inoperative to open the valve when cold.

4. In a relief valve or trap, a casing adapted to be secured to a steam or vapor system and having a passage therethrough for venting said system, a valve seat in said passage, a valve proper movable to and from said seat, said valve being disposed so that subatmospheric pressure within the system tends to maintain the valve closed, a spring element supporting said valve and a thermostatic element bearing on said spring element and operative to close said valve proper when said thermostatic element is hot but inoperative to open same when cold.

5. In a relief valve or trap, a casing adapted to be secured to a steam or vapor system having a passage therethrough for venting said system, a valve seat in said passage, a valve proper movable to and from said seat, said valve being disposed so that subatmospheric pressure within the system tends to maintain the valve closed, a spring element, attached to said valve and a thermostatic element supported at one of its ends, operative to close said valve proper on its seat when said thermostatic element is hot, but inoperative to open said valve when cold, said element being composed of a plurality of composite strips each composed of two metals having dissimilar coefficients of expansion, said strips being of progressively decreased length measured from the supported end.

6. In a relief valve or trap, a casing adapted to be secured to a steam or vapor system and having a passage therethrough for venting said system, a valve seat in said passage, a valve proper movable to and from said seat, said valve being disposed so that subatmospheric pressure within the system tends to maintain the valve closed, means attached to said valve and adapted to open same when the pressure on either side thereof is substantially equal and a thermostatic element having a non-positive connection with said valve whereby said element last mentioned is operative to close same when said element is hot but is inoperative to open the valve when cold.

In testimony whereof I have affixed my signature to this specification.

GEORGE D. CHADEAYNE.